United States Patent

[11] 3,582,540

[72] Inventors Robert Adler
Northfield;
Adrian J. DeVries, Elmhurst; Fleming Dias,
Chicago, all of, Ill.
[21] Appl. No. 817,093
[22] Filed Apr. 17, 1969
[45] Patented June 1, 1971
[73] Assignee Zenith Radio Corporation
Chicago, Ill.

[54] SIGNAL TRANSLATING APPARATUS USING SURFACE WAVE ACOUSTIC DEVICE
8 Claims, 18 Drawing Figs.

[52] U.S. Cl. .......... 178/5.4R, 330/505, 331/107A, 333/30, 333/72
[51] Int. Cl. .......... H04n 9/00, H03h 7/30, H03b 5/00
[50] Field of Search .......... 178/5.4; 333/30, 72; 330/505; 331/107 A

[56] References Cited

UNITED STATES PATENTS 3,446,974 5/1969 Seiwatz .......... 333/72
3,479,572 11/1969 Pokorny .......... 333/30
RE26,091 9/1966 White .......... 330/5.5

OTHER REFERENCES

" Elastic Surface Waves on Free Surface and Metallized Surface of CdS, ZnO, and PZT-4" , by Chin-Chong Tseng, " Journal of Applied Physics" , Vol. 38, No. 11, Oct. 1967

*Primary Examiner*—Robert L. Griffin
*Assistant Examiner*—George G. Stellar
*Attorney*—Francis W. Crotty

ABSTRACT: A color television receiver employs surface wave integratable filters (SWIFS) in a number of its different stages. These include frequency discriminators, phase discriminators, phase shifters, gain control systems, phase splitters, phase delay systems, signal splitters and chroma demodulation systems. The delay in or the tuning of the different individual stages is facilitated by alterations of the velocity of wave propagation or the effective or actual length of the surface over which the waves propagate. In addition, spurious signal modes are minimized by polarizing only selected portions of the SWIFS.

Inventors
Robert Adler
Adrian J. De Vries
Fleming Dias
By Francis W. Crotty
Attorney Inventors
Robert Adler
Adrian J. DeVries
Fleming Dias
By Francis W. Crotty
Attorney Inventors
Robert Adler
Adrian J. De Vries
Fleming Dias
By Francis W. Crotty
Attorney Inventors
Robert Adler
Adrian J. De Vries
Fleming Dias
By [signature]
Attorney Inventors
Robert Adler
Adrian J. De Vries
Fleming Dias
By Francis W. Crotty
Attorney Inventors
Robert Adler
Adrian J. De Vries
Fleming Dias
By Francis W. Crotty
Attorney

SIGNAL TRANSLATING APPARATUS USING SURFACE WAVE ACOUSTIC DEVICE

BACKGROUND OF THE INVENTION

The invention pertains to color television receivers. More particularly, it relates to the inclusion in such receivers of surface wave integratable filters (SWIFS) as signal transmission elements that enable construction of much of the receiver entirely of solid-state components.

A variety of circuit arrangements are known for processing a received composite television program signal in order to reproduce a polychrome image and its associated sound. These different arrangements have in common stages or channels that impose certain selectivity characteristics in order to act differently on different parts of the received composite signal, that is to say, to split or divide different portions of that signal among different channels, to delay the transmission of the signal component in any one channel relative to another and to act upon the different signal components in a manner determined by their frequency or changes in frequency. Heretofore, many of the signal-processing operations have required the use of inductive elements. Typically, these are coils formed by physically winding a length of wire about a core or coil form, yielding a device that often is of significant physical size and which, during manufacture of the receiver, must be fabricated, handled, mounted and adjusted as a separate, discrete component.

Until recently, all television receivers were a combination of a very large number of discrete components such as electron tubes, resistors, condensers and, as mentioned, wire-wound inductors. However, the introduction of the transistor and other solid-state active devices initiated a reduction in component sizes, and the subsequent development of integrated solid-state circuitry has led to at least the anticipation of complete monochrome and color television receivers wherein the entire apparatus, except for the image reproducer, the audio speaker and possibly the radio frequency tuner, is fabricated of solid-state integrated circuitry. This anticipation has been nurtured because of the capability developed in the art of so integrating a number of different circuits each including a variety of active devices, such as transistors, together with interconnecting resistors and capacitors. However, progress toward the ultimate end of a completely integrated receiver has, until recently, been thwarted because of the infeasibility of providing a solid-state equivalent of the inductance necessary to the different signal paths in order to impart such desired characteristics as controlled selectivity and phase shift.

A different approach to obtaining selectivity of a controlled character in the signal transmission channels of color television receivers and other systems that is amenable to solid-state circuitry is the subject of the copending applications of Adrian DeVries, Ser. No. 721,038, filed Apr. 12, 1968, which discloses and claims a variety of acoustic-wave devices in which transducers interact with acoustic surface waves propagated on a substrate. By appropriate selection of the propagating material and design of the transducers, a wide variety of different selectivity characteristics may be obtained. Such devices are useful, for example, in the intermediate-frequency channels of television receivers and in discriminators for demodulating frequency-modulated intelligence such as the audio signal which is part of a composite television program signal. These acoustic wave devices may be fabricated entirely with integrated-circuit techniques and their overall sizes at television frequencies involve dimensions of but fractions of an inch. They lend themselves admirably to combination with other active and passive elements as portions of completely integrated solid-state systems. Because of their nature, such devices have been denoted as surface wave integratable filters and, for convenience, have come to be known by the abbreviation SWIFS.

It is the general object of the present invention to provide new and improved SWIF devices useful for processing signals such as those translated in color television receivers.

It is another object of the present invention to provide new and improved SWIF devices for use in performing such necessary functions of a television receiver as gain control, phase control, chroma demodulation, signal delay, frequency discrimination, signal splitting or dividing and modifications of the foregoing.

A further object of the present invention is to provide SWIF devices of the foregoing character that are capable of being fabricated by and are fully compatible with conventional techniques employed in the manufacture of integrated solid-state circuits.

SUMMARY OF THE INVENTION

A device constructed in accordance with the present invention generally takes the form of apparatus that is to be interposed between a source and a load. Basic to the device is an acoustic-surface-wave propagating medium. Coupled to that medium in all cases is at least one transducer which, in response to signals transmitted between one or more sources and loads, interacts with acoustic surface waves on the medium. In one frequency-discriminator embodiment, a load is in series combination with a unidirectionally conductive device that is coupled across the transducer with the latter serving as a frequency-discriminator.

In another embodiment, the signals are applied in push-pull across a pair of such transducers coupled to the medium with the individual transducers exhibiting maximum interaction at frequencies respectively above and below a center frequency. In this version the pair of transducers serve as a discriminator with respect to signals fed to the load which is coupled between the transducers and a plane of reference potential. Other discriminator embodiments utilize at least three such transducers with one serving as a transmitter and the other two serving as receivers to develop a pair of signals that are in phase quadrature; the discriminator further has means, including a pair of diodes individually coupled directly to opposite terminals of one of the receivers, for matrixing the output signals and detecting variations therein in response to frequency deviations of the input signals from a reference or center frequency.

Other portions of a television receiver constructed in accordance with the present invention include a SWIF having input and output transducers together with a control transducer disposed in the path of acoustic-surface-waves traveling between the other two transducers; a variable load impedance coupled across the control transducer is adjusted in magnitude to alter the gain or phase of the transmitted signal. In a further embodiment, which may be combined with that just mentioned, a SWIF includes a plurality of output transducers spaced selectively different distances from an input transducer and which develop a corresponding plurality of output signals differing in relative phase; at least two of those output signals are mixed in a color demodulator with the chroma signal to develop color image control signals.

In accordance with a further aspect of the present invention, a SWIF included in a color television receiver comprises corresponding pairs of input and output transducers with one pair delivering intermediate-frequency signal energy to a luminance channel and the other delivering a portion of that same energy to a chroma channel; the output transducers have different spacings from their associated input transducers in order to equalize the time delays of the two different channels. In another embodiment for introducing a time delay to a detected television signal, the video signal is first modulated onto a carrier and then fed to the input transducer of a SWIF; a signal derived from an associated output transducer is then demodulated to develop a delayed video signal having a delay determined by the SWIF. Other features of the invention concern arrangements to permit splitting of different signals, tuning, adjustment of phase delay and increases in efficiency.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
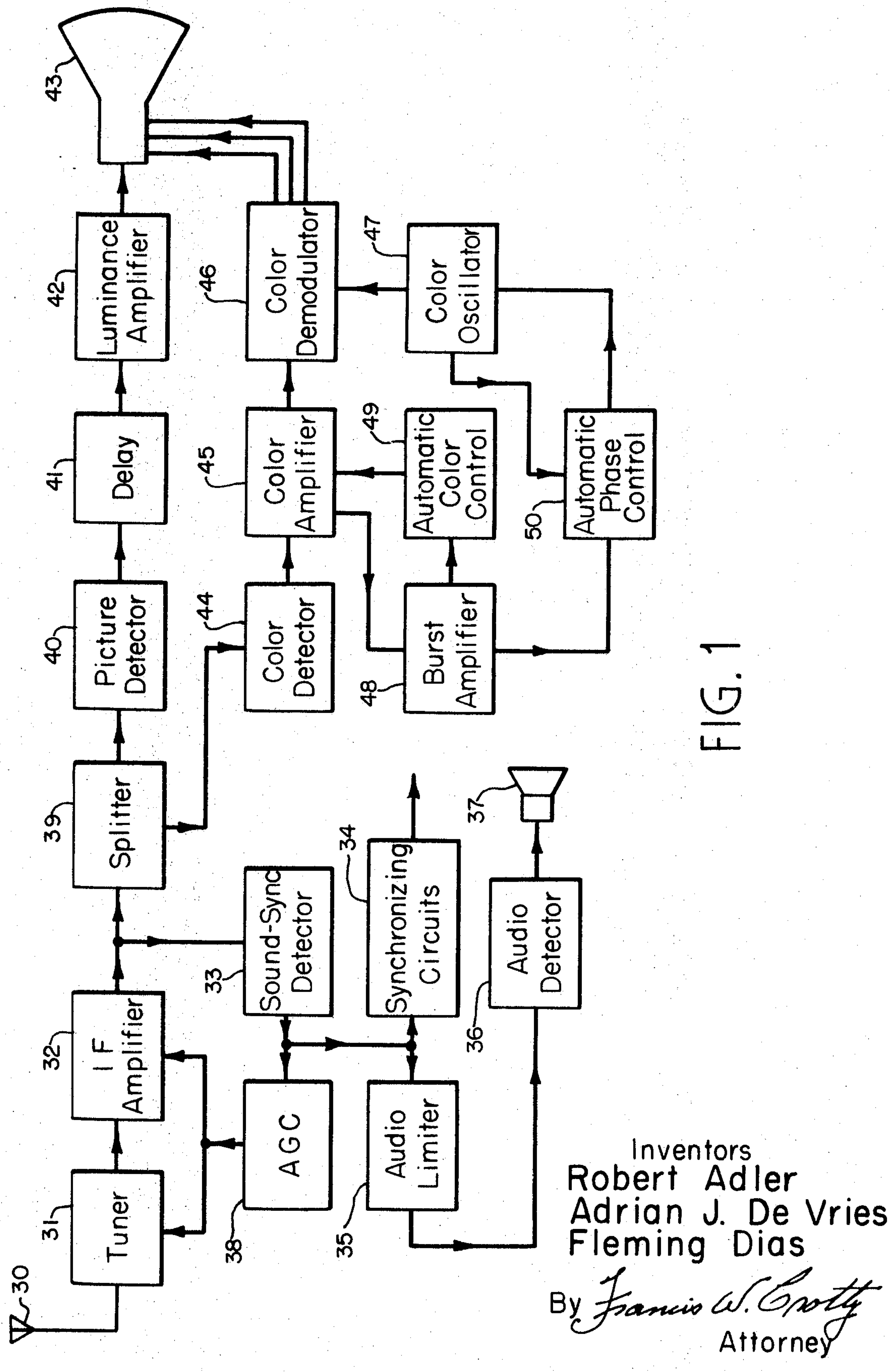
FIG. 1 is a block diagram of a color television receiver in which embodiments of the invention are utilized.

FIG. 1 illustrates a color television receiver having but one of many different signal-processing approaches which, in the overall, may be utilized in taking advantage of improvements made available with the present invention. Radiofrequency color program signals received by an antenna 30 are fed to a tuner 31 that selects a desired program signal and converts it to an intermediate-frequency signal which, in turn, is fed to an intermediate-frequency signal which, in turn, is fed to an intermediate-frequency amplifier 32. The frequency response of amplifier 32 is carefully tailored to amplify or attenuate different portions of the composite signal in a manner to be discussed further in connection with FIG. 2. One portion of the signal delivered by amplifier 32 is fed to a detector 33 that selects from the intermediate-frequency signal and demodulates both the synchronizing signals and the audio program signal. Being separable by virtue of their individually different frequency characteristics, these two signals are respectively fed to synchronizing circuits 34 and an audio system composed of a limiter 35, a detector and amplifier 36 and a loud speaker 37. The horizontal-deflection synchronizing signal pulses also are fed to an automatic gain control system 38 in which the level of those pulses is utilized to develop a gain-control potential that is fed back to tuner 31 and to intermediate-frequency amplifier 32 in a manner to control their gain such that the developed intermediate-frequency signal is of constant amplitude; as now well understood, this arrangement preferably includes means for gating or turning on the AGC system only during the existence of the horizontal sync pulses. From a systems' standpoint, as well as with respect to details of circuitry that may be used particularly in the synchronizing circuitry, the operations of the synchronizing, automatic-gain control and audio portions of the receiver are well understood and conventional in the art. Accordingly, they need not be further discussed herein except with respect to certain specific improvements to be described later.

Another portion of the intermediate-frequency output signal from amplifier 32 is fed to a signal splitter 39 that separates certain portions of the composite signal on the basis of frequency; in practice, splitter 39 may be immediately preceded by an additional intermediate-frequency stage for further attenuation of the audio program signal, or, alternatively, this selectivity function may be included in splitter 39 itself. One output signal from splitter 39 is applied to a luminance channel composed of a picture detector 40, a delay element 41 and a luminance amplifier 42. Detector 40 develops from the incoming composite signal a luminance or video signal that is representative of the brightness of the image to be reproduced. For reasons to be described later, that signal is delayed in time by delay element 41 and then strengthened by amplifier 42 before it is applied to one input electrode of each electron gun of an image reproducer 43 which in present-day usage is in the form of a three-gun cathode-ray tube. The video signal is used in this instance to intensity modulate the three electron beams of the color picture tube. Of course, the electron beams are simultaneously caused to be deflected both horizontally and vertically to define an image raster, under the timing control of the synchronizing circuitry.

Another portion of the composite intermediate-frequency signal fed to splitter 39 is directed into a chroma channel basically composed of a color detector 44, a color amplifier 45 and a color demodulator 46. Detector 44 yields a chroma signal that is amplified by amplifier 45 and supplied to demodulator 46 which also receives a reference signal from a color oscillator 47. Demodulator 46 develops three color-control signals, generally representative of red, green and blue in the ultimate image, that are supplied to additional control electrodes of assigned ones of the three electron guns in image-reproducer 43 so as further to control the intensity individually of the three different beams and, hence, the ultimate hue and saturation of the reproduced image. Typically, the color-control signals are so-called color-difference signals that represent, with respect to each color, the difference between the instantaneous value of the luminance signal and the corresponding primary color value of the image point being displayed; by appropriate combination or internal matrixing of these various signals applied to the respective electron beams, essentially true primary colors are developed.

In traversing the chroma channel, the color information signal experiences a time delay and the function of delay element 41 is to similarly delay the luminance signal to the end that, when recombined within image reproducer 43, the luminance and chrominance signals are properly correlated. As will be described further, the function of delay element 41 may be achieved within signal splitter 39 in which case element 41 would not be required as a separate stage. On the other hand, other well-known receiver signal-processing systems utilize a common detector for the luminance and chroma signals and in those cases, splitter 39 may be omitted or, in a further alternative, it may be used instead to separate out the audio and synchronizing signals while tailoring the frequency response presented to the composite signal portion fed on to the video detector.

Also associated with the chroma channel and reference oscillator 47 are a burst amplifier 48, an automatic-color-control system 49 and an automatic phase control 50. Amplifier 48 selects from the color signal applied thereto the color burst signal which conventionally is transmitted as a part of the composite program signal to enable synchronized operation of color demodulator 46. To that end, the amplifier is gated or other wise controlled to supply the color burst signal to an automatic phase control system 50 which also receives a sample of the reference signal developed by oscillator 47. Control system 50 compares the phase of its two input signals to develop a control signal that is fed back to reference oscillator 47 to maintain the phase of its output signal, fed to demodulator 46, precisely at the requisite value. A portion of the color burst signal is also fed from amplifier 48 to an automatic color control system 49 which develops a control signal that is representative of the burst signal amplitude and is fed back to color amplifier 45 to control its gain in a manner to maintain constant the strength of the color signal fed to demodulator 46.

The functions and manner of overall operation of each of the luminance and chroma channels are well understood and basically conventional in the art. It is, therefore, unnecessary to describe them further. Similarly, the receiver is understood to include such conventional additional circuits and components as those which enable the control of tone and volume of the audio signal, contrast and brightness of the image, hue and saturation of the color and a circuit to kill the operation of the chroma channel when the received composite program signal includes only monochrome picture information.

Typically, the receiver also includes a plurality of different traps located at various places in its signal paths in order to preclude transmittal of undesired signal components. Proper operation of the color television receiver demands that each of the several different signal paths thereof exhibit accurately determined selectivity to emphasize and pass those signal components desired in that path and attenuate or reject other signal components that may in any way interfere with the desired components. While the signal-transmission characteristics required in the different paths or channels are now well-known, making it unnecessary to discuss the different characteristics of all of the various different paths, it is appropriate to examine the overall characteristic desired for the intermediate-frequency amplifier, including amplifier 32 and the previously mentioned additional stage that may precede or be included in splitter 39.

Figure 2:
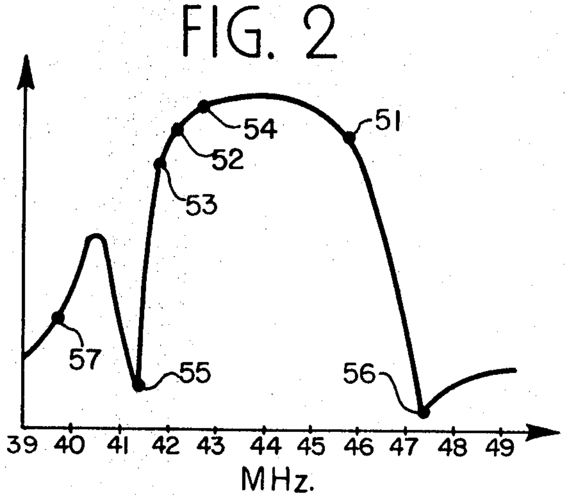
FIG. 2 is a diagram illustrating an intermediate-frequency response desired in the receiver of FIG. 1.

FIG. 2 depicts such a selectivity characteristic or response curve in terms of signal amplitude as a function of frequency. As indicated, the intermediate-frequency channel exhibits a broad bandwidth of transmission for the desired composite program signal between about 41.5 and 46 megahertz. More specifically, the selected composite program signal IF carrier is indicated by marker 51 located at 45.75 megahertz, while the chroma subcarrier thereof, indicated by marker 52, is located at 42.17 megahertz. The upper and lower ends of what may be termed the chroma signal passband are indicated respectively by markers 53 and 54 at 41.75 and 42.77 megahertz. So as not to interfere with the image information, the associated sound carrier is located at 41.25 megahertz as indicated by marker 55 and the sound carrier of the adjacent composite-signal channel is even more greatly attenuated as shown by marker 56 located at 47.25 megahertz. To complete the overall representation, the adjacent program signal channel on the other side has its primary picture carrier located at 39.75 megahertz as depicted by marker 57. It will thus be seen that the overall frequency response of the intermediate-frequency channel is characterized by the presentation of what basically is a broad bandwidth over approximately 4.5 megahertz while being substantially reduced at those frequencies corresponding to the adjacent picture and sound carriers as well as the associated sound carrier. Such reduced response at those points typically has been obtained by the inclusion of additional trap circuits tuned to each of those different frequencies.

As indicated above, application Serial No. 721,038 discloses in detail an approach that employs a combination of SWIFS in the intermediate-frequency channel of a color television receiver to achieve a selectivity characteristic of the kind shown in FIG. 2. In one example, the individual selectivity characteristics of three different SWIFS in series in the intermediate frequency channel are combined to give the overall desired characteristic. The use of the SWIFS, instead of such typical frequency-determining elements as coils, enables construction of the entire intermediate-frequency amplifier as a single integrated circuit extremely small in size.

Figure 3:
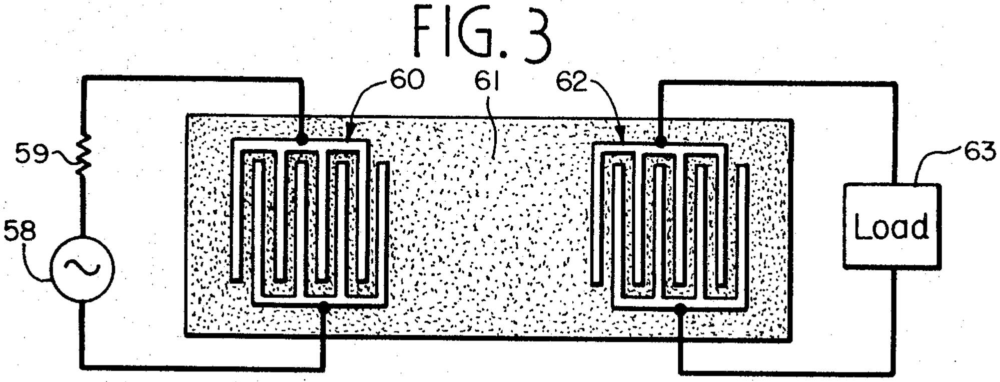
FIG. 3 is a schematic diagram of a SWIF system.

For the purpose of explaining in more detail the basic nature and principles of operation of a SWIF in general, FIG. 3 illustrates one form of a very simple SWIF that also is disclosed and described in the aforementioned copending application. A signal source 58 in series with a resistor 59, which may represent the internal impedance of that source, is connected across an input transducer 60 mechanically coupled to one major surface of a body of piezoelectric material shown as a substrate 61 and which serves as an acoustic-surface-wave propagating medium. An output or second portion of the same surface of substrate 61 is, in turn, mechanically coupled to an output transducer 62 across which a load 63 is coupled.

Transducers 60 and 62 in this simplest arrangement are identical and are individually constructed of two comb-type electrode arrays. The stripes or conductive elements of one comb are interleaved with the stripes of the other. The electrodes are of a material, such as gold or aluminum, which may be vacuum deposited or photoetched on a smoothly lapped and polished planar surface of the piezoelectric body. The piezoelectric material is one, such as PZT, Zinc Oxide, Lithium Niobate or quartz, that is propagative of acoustic surface waves. The distance between the centers of two consecutive stripes in each array is one-half of the acoustic wavelength of the signal wave for which it is desired to achieve maximum response.

Direct piezoelectric surface-wave transduction is accomplished by the spatially periodic interdigital electrodes or teeth of transducer 60. A periodic electric field is produced when a signal from source 58 is fed to the electrodes and, through piezoelectric coupling, the electric signal is transduced to a traveling acoustic wave on substrate 61. This occurs when the stress components produced by the electric fields in the piezoelectric substrate are substantially matched to the stress components associated with the surface-wave mode. Source 58, for example, a portion of the television receiver in FIG. 1, produces a range of signal frequencies, but doe to the selective nature of the arrangement only a particular frequency and its intelligence carrying sidebands are converted to a utilized surface wave. More specifically, source 58 may be tuner 31 which selects the desired program signal for application to load 63 which in this environment includes one or more of those signal channels beginning with detectors 33, 40 and 44. The surface waves resulting in substrate 61, in response to the energization of transducer 60 by the IF signal, are transmitted along the substrate to output transducer 62 where they are converted to an electrical signal for application to load 63. The signal will suffer attenuation in traversing the SWIF under consideration which will be compensated and the other IF gain requirement satisfied by IF amplification, preferably of the solid state type e.g. transistors associated with or formed as part of the SWIF.

In a typical television IF embodiment, utilizing PZT as the piezoelectric substrate, the stripes of both transducer 60 and transducer 62 are approximately 0.5 mil wide and are separated by 0.5 mil for the application of an IF signal in the typical range of 40—46 megahertz. The spacing between transducer 60 and transducer 62 is on the order of 60 mils and the width of the wave front is of approximately 0.1 inch. This structure of transducers 60 and 62 and substrate 61 can be compared to a cascade of two tuned circuits with a resonant frequency of approximately 40 megahertz, the resonant frequency being determined, at least to a first order, by the spacing of the stripes of the transducers.

The potential developed between any given pair of successive stripes in electrode array 60 produces two waves traveling along the surface of substrate 61 in opposing directions perpendicular to the stripes for the illustrative isotropic case of a ceramic poled perpendicularly to the surface. When the center-to-center distance between the stripes is one-half of the acoustic wavelength of the wave at the desired input frequency, or is an odd multiple thereof, relative maxima of the output waves are produced by piezoelectric transduction in transducer 62. For increased selectivity, additional electrode stripes are added to the comb patterns of transducers 60 and 62. Further modifications and adjustments are described in the aforementioned copending application for the purpose of particularly shaping the response presented by the filter to the transmitted signal.

Standard-broadcast television program signals convey the audio intelligence as a frequency modulation of a sound subcarrier. While the audio information may be derived directly from the intermediate frequency audio subcarrier at 41.25 megahertz, in which case detector 33 would merely pass that signal to limiter 35, it is preferred to utilize the well known approach in which detector 33 produces a 4.5 megahertz intercarrier beat signal that is modulated with the audio information. Accordingly, audio detector 36 in FIG. 1 is a detector for demodulating the frequency-modulated audio signals from the intercarrier beat signal. Solid-state integrated fabrication of that detector is afforded by the discriminator of FIG. 4 wherein a SWIF includes but a single transducer 64 disposed on the surface of a piezoelectric substrate 65. The center-to-center spacing of the electrodes forming the interleaved combs of transducer 64 correspond to one-half of a surface-wave-wavelength at the 4.5 megahertz intercarrier beat frequency.

Coupled across transducer 64 through a blocking capacitor 66 is a source 67 which in this case is audio limiter 35. Also coupled directly across transducer 64 is the series combination of a unidirectionally conductive device or diode 68 and a load 69 herein exemplified by loud speaker 37 which usually would be preceded by one or more stages of audio amplification. A resistor 70 connected across transducer 64 serves as a direct-current bypass, and a discharge resistor 71 paralleled by a holding capacitor 72, with both being connected in parallel to load 69, form a peak detector load circuit for diode 68.

Figure 5:
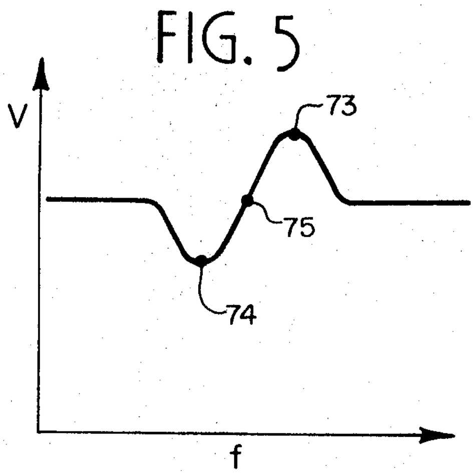
FIG. 5 is a response curve illustrating a characteristic of the FIG. 4 discriminator.
Figure 4:
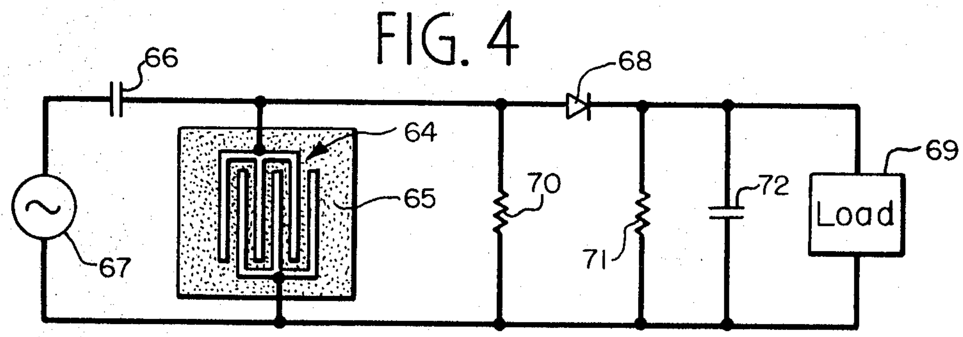
FIG. 4 is a schematic diagram of a SWIF discriminator.

In operation, the discriminator in FIG. 4 presents, to the signals from source 67, a selectivity response illustrated by the curve in FIG. 5 which represents the amplitude of the output signal applied to load 69 as a function of frequency. Transducer 64 as incorporated with the other circuit elements exhibits maximum response, by virtue of the selection of its electrode spacing, at a point 73. This represents an antiresonant condition of the transducer. Upon an increase in the frequency of an applied signal from a much lower value toward point 73, the signal first encounters a region of increased attenuation as indicated at point 74; this occurs because of a condition of series resonance of the transducer and its associated circuitry. By selecting the electrode spacing of transducer 64 so that the combination of capacitor 66 and transducer 64 exhibits maximum response at point 73, the center or undeviated frequency of the incoming frequency modulated signal is caused to be located at a point 75 approximately midway between points 73 and 74 in the region of the curve that exhibits a substantially typical linear frequency-discrimination characteristic. Consequently, the audio intelligence carried by the incoming frequency-modulated signal is converted to an amplitude-modulated signal that is detected by diode 68 and supplied to load 69.

Figure 6:
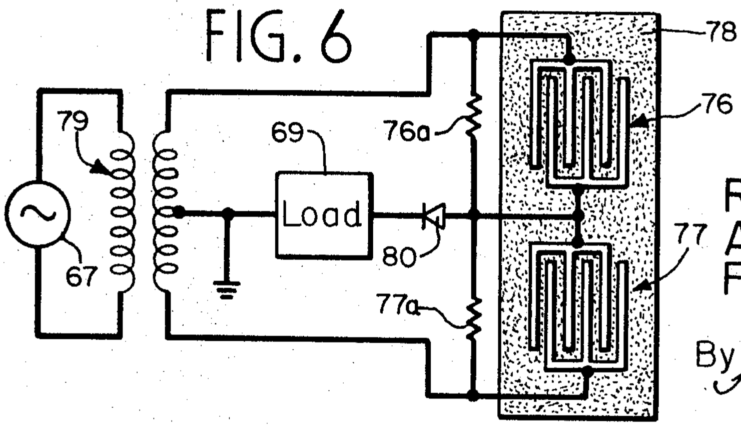
FIGS. 6, 7 and 8 are schematic diagrams of alternative SWIF discriminators.

An alternative discriminator for interposition between source 67 and load 69 is shown in FIG. 6 wherein a pair of transducers 76 and 77 are disposed on a piezoelectric substrate 78. Transducers 76 and 77 are spaced laterally apart on substrate 78 so that each interacts exclusively with its own set of acoustic surface waves. In a manner the same as that described in copending application of Adrian DeVries, Ser. No. 681,524, filed Nov. 8, 1967, transducers 76 and 77 are interconnected in a bridge network and fed in push-pull from source 67. Also similarly, the two transducers are tuned to somewhat different frequencies so as to unbalance the bridge with the result that a signal is fed to load 69. In this case, however, load 69 constitutes a portion of a peak detector. In more detail, the primary winding of a transformer 79 is coupled across source 67 while the opposite ends of its secondary winding are connected across transducers 76 and 77 which, in turn, are interconnected in series combination and individually shunted by respective direct-current bypass resistors **76*a* and 77*a*. The series combination of load 69 and a diode 80 is connected between a point intermediate transducers 76 and 77 and a center tap on the secondary winding which represents a point of reference potential here indicated as ground; load 69 includes a discharge resistor and holding capacitor, as in the system of FIG. 4, to serve along with diode 80** as a peak detector circuit.

In operation, the frequency-modulated signals from source 67 are applied to the series combination of transducers 76 and 77 in push-pull with respect to the point of reference potential. The transducers and the transformer secondary winding together act as a band-pass filter having a conventionally shaped frequency response curve. By selecting the individual response peaks of transducers 76 and 77 so that the undeviated or center frequency of the signal from source 67 falls on an intermediate portion of one slope of the overall response curve, the audio information is demodulated.

Figure 7:
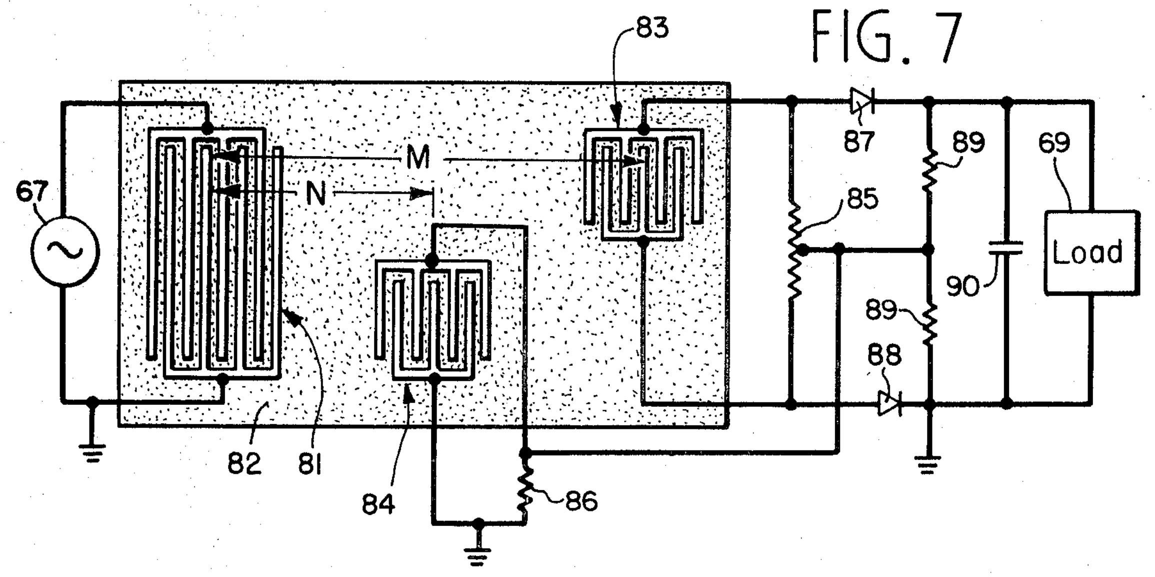
Figures 8, 9:
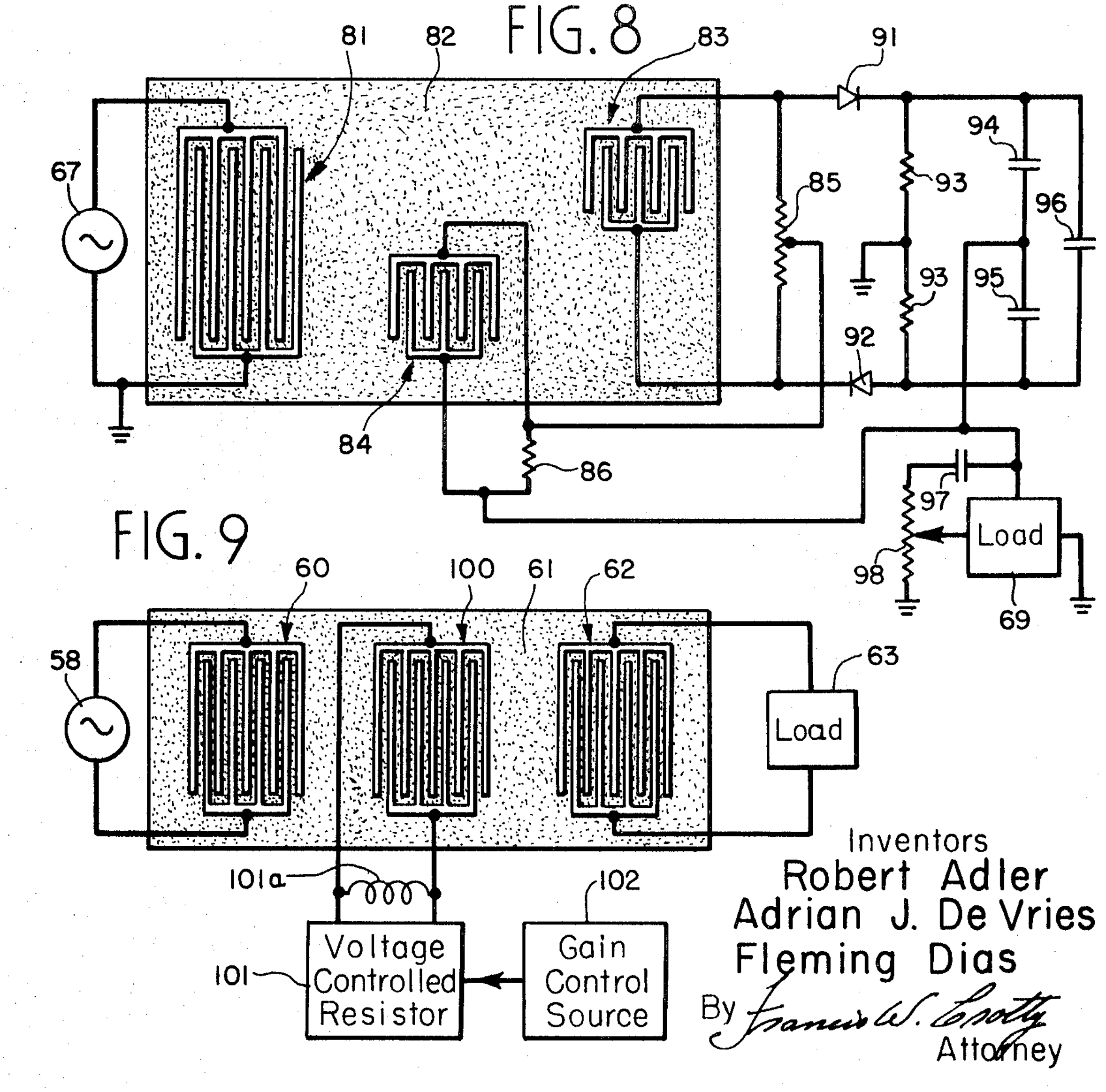
FIG. 9 is a schematic diagram of a SWIF signal transmission control system.

Two alternative frequency-modulation detectors appear in FIGS. 7 and 8. In both cases, input source 67 is coupled across an input or transmitting transducer 81 disposed on a substrate 82 of the piezoelectric material. Also situated on that surface of substrate 82 are a pair of output transducers 83 and 84 with transducer 83 being disposed toward one side of the path of the waves launched by transducer 81 and transducer 84 being disposed to the other side of that path. Moreover, transducer 83 is spaced from transducer 81 by a distance M while the spacing between the input transducer and the other output transducer 84 is a lesser distance N. The distance M differs from the distance N by an amount that equals an integral number of surface wavelengths plus or minus one-quarter of such a wavelength, the wavelength corresponding to the center frequency of the frequency-modulated signal. Also, all three transducers 81, 83 and 84 have their electrode spacings selected so as to exhibit maximum response at that center frequency. By reason of the relative spacings of the two output transducers from the input transducer, the output signals developed individually across the respective output transducers are in phase quadrature.

Also in both of FIGS. 7 and 8, the output signals developed by transducer 83 are derived in push-pull from across a center-tapped load resistor 85. The other output signals from transducer 84 are developed across a load resistor 86 that shunts that transducer and is connected between the center-tap and a plane of reference potential shown as ground in FIG. 7 and as a balance point in the network of FIG. 8. In each of these two discriminators, the push-pull signals appearing across load resistor 85 are applied to a network which includes a matrix and direct current return path such that the quadrature potential developed by transducer 84 is suitably inserted into the network and matrixed with the output signal from transducer 83.

In FIG. 7, the matrix network includes a pair of diodes 87 and 88 individually connected with the same direction of polarity to respective opposite ends of resistor 85. The other, or cathode ends, of the diodes individually are connected to respective opposite ends of another center-tapped resistor 89, and its center tap is connected in common with that of load resistor 85. Load 69 is connected across the opposing ends of resistor 89 which also is shunted by a smoothing capacitor 90. One end of resistor 89 also is connected to ground. The FIG. 7 discriminator resembles the well-known Foster-Seeley type. At center frequency the output signal level is zero regardless of the input signal level; consequently, amplitude variations are balanced out to a degree.

The matrixing and detecting network of FIG. 8 is generally similar to that of the previous version except that one of the diodes is reversed in polarity so that diode 91 has its anode connected to one end of resistor 85 while diode 92 is connected from its cathode to the other end of that resistor; each half of resistor 85 presents a reasonably low impedance to intermediate-frequency signals. The other terminals of diodes 91 and 92 are connected by a resistor 93 center-tapped to ground, a capacitive divider composed of capacitors 94 and 95 and a storage capacitor 96 on which a reference or damping potential inherently is maintained during operation. The outgoing audio signal is derived from between capacitors 94 and 95 and fed through a blocking capacitor 97 across a potentiometer 98 unbalanced to ground. The output signal as presented across resistor 98 is picked off by the tap on the potentiometer and fed to one terminal of load 69 the other terminal of which is also connected to ground. This FIG. 8 version is similar in operation to the conventional ratio-detector demodulator. Should the input signal level suddenly change, capacitor 96 acts as a damper and thus tends to reduce the effect of that change. Hence, there is a degree of amplitude limiting effect.

Both the discriminators of FIGS. 7 and 8, as well as those of FIGS. 4 and 6, have a distinct advantage in that the selectivity of the resultant audio detection channel is controlled by one or more of the SWIF transducers involved. For example, in each of FIGS. 7 and 8 the selectivity may be limited to as narrow a band as desired by the choice of the number of electrodes employed in input transducer 81; an increase in the total number of electrodes serves to decrease the bandwidth. An additional advantage of the arrangements of FIGS. 7 and 8 is the presence of an inherent balancing function so as at least partially to preclude the detection of spurious information in the form of amplitude changes in the incoming signal. Consequently, the purpose served by audio limiter 35 in FIG. 1 is enhanced and, in some cases, that limiter may even be omitted.

In both FIGS. 7 and 8, the frequency to amplitude conversion of the intelligence-carrying modulation is obtained by applying to a pair of diodes voltages that are in quadrature whenever the frequency-modulation carrier is unmodulated. The relative phase of the quadrature signals is altered in direct proportion to the modulation frequency swing. That change alters the phase of the relative potentials across the diodes in a manner such that the detected difference voltage is a replica of the modulating signal.

To aid a particular application of the discriminator of either of FIGS. 7 and 8, it may be noted that the phase shift $\Phi$ between the output signals from transducers 83 and 84 can be represented by the expression:

$$\Phi=(M-N/\lambda)\,2\pi,$$

when the two transducers are alike (except for spacing from transducer 81) and where $\lambda$ is the instantaneous wavelength of the surface waves. From the previous discussion, the output transducer spacing difference can be written:

$$M-N=(n+1/2)\lambda_o/2,$$

where $n$ is an integer and $\lambda_o$ is the wavelength of the surface waves at the undeviated center frequency $f_o$. From these two relationships:

$$\Phi=(n+1/2)f/f_o\pi,$$

where $f$ is the instantaneous input signal frequency. It may also be noted that, by definition, the surface-wave velocity $v$ may be expressed:

$$v=f\lambda=fao\lambda_o.$$

Also by definition:

$$f=f_o+\Delta,$$

where $\Delta f$ is the instantaneous deviation of the input signal from the center frequency $f_o$. Consequently:

$$\Phi=(n+1/2)+(n+1/2)(\Delta f/f_o)Ab.$$

For good linearity, the variation in phase angle $\Phi$ generally should be less than about 45°. Expressed another way, the spacing $(M-N)$ between transducers 83 and 84 should be less than the quantity $$\Delta\lambda/4\lambda_o,$$

where $\Delta\lambda$ is the instantaneous input signal deviation in terms of surface wavelengths. In the present television environment utilizing intercarrier sound takeoff, the quantity $\Delta f/f_o$ is approximately $10^{12}$ (or the value of $\Delta\Phi/\Phi_o$ approximates 1/100. This indicates, for a practical value of $n$ of about 25, a spacing $(M-N)$ of 12 and ¾ wavelengths.

In one alternative to either the system of FIG. 7 or that of FIG. 8, the efficiency of the SWIF is improved by elongating substrate 82 and disposing a mirror-image pair of receiving transducers to the left of input transducer 81 and connecting them individually in parallel with respect to transducers 83 and 84. In that manner, the surface waves inherently launched to the left of input transducer 81 also are utilized in the development of the demodulated output signal. In a still different version of these two discriminators, transducer 81 is disposed on substrate 82 between output transducers 83 and 84, the input transducer being closer to one of the output transducers than the other by the aforementioned difference $(M-N)$ so that the quadrature relationship of the output signals at the center frequency is maintained. In this version, the efficiency also may be increased by extending the length of the electrodes in each of transducers 83 and 84 so as to interact with the full width of the wave fronts launched by input transducer 81 in the two respective directions, although some change in the parameters may be needed in order to compensate the increased mutual transducer interaction. Moreover, transducer 84 can, in principle, be omitted and its function served by transducer 81. However, the illustrated arrangements may be more advantageous in many cases because of the increased isolation between input and output and of additional selectivity.

The arrangement of FIG. 9 features the inclusion of automatic gain control of the transmitted signal by acting directly upon the surface waves being transmitted. As shown, this is accomplished by modifying the simplified SWIF of FIG. 3 to include an additional transducer 100 interposed between input transducer 60 and output transducer 62. Coupled across transducer 100 is a variable load impedance 101, such as a resistor the value of which is voltage controlled. The load impedance level is adjusted by means of a control signal from a source 102 of a gain-controlling potential. Consequently, for the particular application under consideration, source 102 may be served by the automatic gain control system 38 in FIG. 1 that develops a control potential from the horizontal synchronizing pulses.

The spacing of the electrodes in transducer 100 are approximately the same as those in transducers 60 and 62 and all three exhibit a maximum response at the frequency of the signals being transmitted. Moreover, an inductor **101*a* preferably shunted across transducer 100 has a value to resonate with the clamped capacitance of this transducer at the transmitted signal frequency. The clamped capacitance is that which is exhibited across the transducer at the signal frequency when substrate 61 is inhibited from moving mechanically. In general, the gain-control effects to be described will occur without the inclusion of inductor 101*a*** but in that case will occur to a lesser degree.

When impedance 101 is adjusted to have a value much higher than that presented by transducer 100, most of the surface wave energy launched by transducer 60 is reflected at transducer 100 and directed back toward transducer 60. In principle, an infinite value of impedance 101 would cause all of that energy to be reflected. On the other hand, when the value of impedance 101 is the same as that of transducer 100, one-half the wave energy is allowed to pass on to output transducer 62. With a much lower value of impedance 101, most of wave energy is transmitted to the output transducer. Thus, the level of signal transmitted through the SWIF to load 63 is controllable directly in response to adjustment of the control potential from source 102 which determines the effective value of impedance 101. As is known, a surface-wave transmitter approximates an electrical circuit in which a capacitor, here the clamped capacitance, is in parallel with a series-resonant tuned circuit. In FIG. 9, impedance 101 and the clamped capacitance act together as a load on the series-resonant circuit which, in actuality, is mechanical in nature. In operation, the amplitude and phase of the reflected and transmitted surface waves are controlled by adjusting the magnitude and phase angle of the load. While that adjustment in this case is accomplished by varying the external load resistance, the variable alternatively could be capacitive or inductive.

Figure 10A:
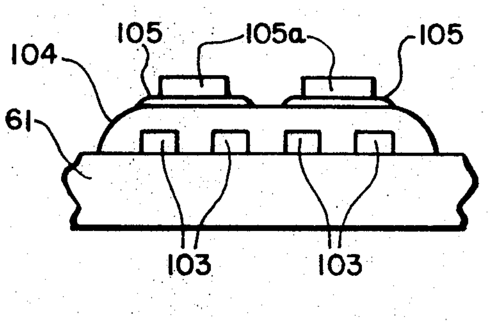
FIGS. 10*a* and 10*b* are, respectively, fragmentary front elevational and plan views (the latter partly schematic) showing a modification of the FIG. 9 system.
Figure 10B:
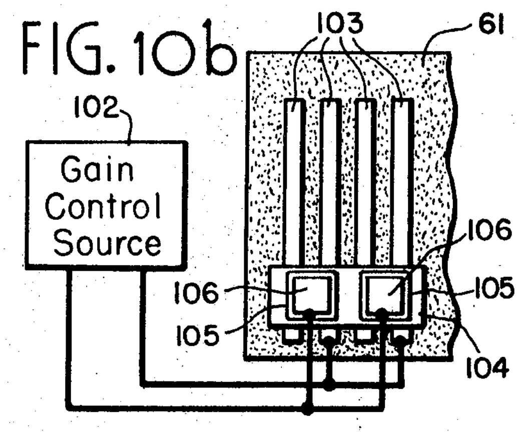

FIGS. 10*a* and 10*b* illustrate, with exaggerated thicknesses, a thin-film solid-state version of variable load impedance 101 integrated directly with transducer 100. Electrodes 103 of transducer 100 are directly covered with a layer 104 of a semiconductive material such as cadmium sulfide. In turn deposited on top of layer 104 are a plurality of insulating strips 105, of silicon monoxide or the like, individually disposed to effectively bridge respective opposing pairs of electrodes 103. Overlying strips 105 are a corresponding plurality of conductive elements or gates 105*a*. Gates 105*a* are connected in parallel to one output terminal of gain control source 102 while the electrodes in one of the combs are connected in parallel to the other output terminal of that source.

In operation, each element 105*a* serves as the gate of a field-effect transistor assembly also including layer 104 and the underlying pair of electrodes that function respectively as a source and a drain. In general, the creation of an electric field between the gate and one of the electrodes creates a region between the electrodes in which the conductivity is changed. With the application of no control potential from source 102, layer 104, being semiconductive, constitutes a partial shunt between the electrode pairs and thus presents a particular impedance across the transducer as a whole. However, the application of a potential from source 102 changes the impedance between each electrode pair as a result of which the overall load impedance imposed upon transducer 100 likewise is changed. As explained in connection with FIG. 9, that change in load impedance alters the signal transmission level through the SWIF. For example, the application of an increasing control potential with an N—type semiconductor results in the presentation to transducer 100 of a lower load impedance so that transducer 100 reflects a smaller portion of the surface waves back toward transducer 60. For maximum control, the average load impedance value is selected to match the impedance presented by transducer 100 at the average signal transmission level.

It will be readily recognized that other integrated solid-state devices may be employed in an analogous manner to act as a variable impedance impressed across transducer 100. For example, the field-effect transistors may be replaced with junction-forming elements that function as conventional or pin diodes; their small-signal impedances may be varied by a DC bias current. Although the concept of utilizing a variable-loaded transducer for the purpose of gain control has been specifically explained as applied to the simple SWIF of FIG. 3, it is to be recognized that its utility may be extended by incorporating it into any of the other embodiments illustrated in this application as well as in still other surface wave-devices. For example, and although it often may be undesirable to alter the impedance of a detector, transducer 100 in some cases may be interposed in the SWIF of either FIGS. 7 or 8 between the transmitting and receiving transducers in a manner to serve as an automatic audio gain control or the means of affording manually adjusted volume control.

Figure 11:
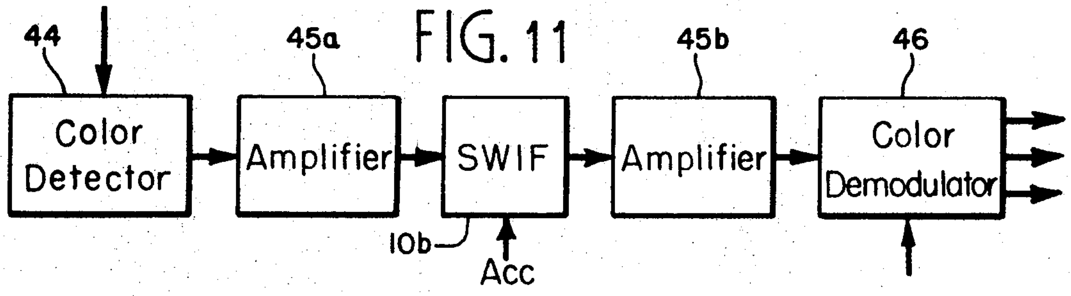
FIG. 11 is a block diagram of a modification of the system of FIG. 1.

Somewhat analogously, the selective characteristic and versatility of the SWIF may be advantageously utilized in the chroma channel of the FIG. 1 color television receiver. As shown in FIG. 11, for example, the chroma channel may be modified to include color detector 44, a first chroma amplifier 45*a*, a SWIF 106, a second chroma amplifier 45*b* and color demodulator 46. The particular band-pass characteristic of SWIF 106*b* is shaped, following the teachings of the aforesaid copending application Ser. No. 721,038, to extract from the signal demodulated by detector 44 the desired color sidebands while attenuating such undesired signal information as the associated sound carrier. Typically, SWIF 106*b* exhibits a passband of about one MHz centered about the 3.58 MHz color subcarrier; at the same time, it attenuates the sound carrier at 4.5 MHz. In practice, such a SWIF may be like that of FIG. 3 with transducers each having about seven electrodes. A SWIF of that nature still may be very small in size, having a length of less than one-half inch. Yet, it exhibits skirt selectivity (steepness of the end portions of its response curve) that is greatly improved as compared with a conventional tuned circuit using an inductor. The attenuation in such a filter is approximately 25 db., a value entirely consistent with the combination in the chroma channel of integrated solid-state amplifiers 45*a* and 45*b* which readily can provide the gain necessary to compensate for that attenuation while affording the additional amplification needed between color detector 44 and color demodulator 46.

Moreover, SWIF 106*b* preferably is fabricated to include one or more gain-control transducers interposed between its respective input and output transducers, in the manner of transducer 100 in FIG. 9, to serve the function of an automatic chroma control element in response to the control signal from system 49 in FIG. 1. In this way, the chroma signal fed to color demodulator 46 is maintained at a constant level despite fluctuations of the received chroma signals that are not compensated by the automatic gain control applied to tuner 31 and IF amplifier 32. Similarly, or as part of the very same gain-control arrangement, a variably loaded transducer, like transducer 100 of FIG. 9, may be interposed between the input and output transducers of SWIF 106*b* to attenuate at least in part the chroma signal in response to color-killer action during receipt of monochrome signals. Color killer circuits for developing a control potential in the absence of a chroma component in a received program signal are well-known and such a control potential may be employed to adjust the magnitude of the variable impedance associated with the control transducer, in the manner of FIG. 9 for example, to effectively interrupt signal translation in the chroma channel.

The chroma information modulated on the color subcarrier in the standard-broadcast system is so formulated that, by sampling the color information at different particular instants during each cycle of the subcarrier, a variety of different color-control signals may be derived for application to the image reproducer. Although primary-color-representative control signals may be derived for use directly in the reproducer, it is more customary to derive color-difference signals which subsequently are matrixed with the luminance signal either externally or internally of the image reproducer to yield the ultimate primary-color mode of image reproduction; the separate development of the luminance signal as shown in FIG. 1 has the advantage of permitting the direct display of a monochrome image during reception of that mode of received composite program signal.

In any event, the operation of color demodulator 46 to derive the color-control signals typically involves the receipt of reference signals from color oscillator 47 of the same basic frequency as the color subcarrier of the received program signal but phased in correspondence with the different instants in time at which the color information is desired to be sampled. In conventional discrete-component receivers, the necessary color-reference signals of mutually different phase are obtained by the use of wound inductors. Such lumped components may be avoided in the present color television receiver by using the SWIF of FIG. 12 which provides a plurality of differently phased output signals in response to a single signal received from reference oscillator 47. Oscillator 47 is coupled across an input transducer 107 coupled to a piezoelectric substrate 108 to launch acoustic surface waves toward a plurality of individual output transducers 109, 110 and 111 distributed laterally across the path of the launched acoustic waves. Each of the transducers is fabricated to exhibit maximum response at the frequency of the color reference signal which is the same as that of the broadcast color subcarrier signal and in the standard system is 3.58 megahertz. It may be noted that, for this application, a typical size of substrate 108 is in the order of only 1 inch square. Even then, as also is true with the other SWIFS described herein, there usually is room left on the front of the substrates for mounting associated active integrated circuits. Moreover, the entire backside of each substrate may be used for mounting additional integrated circuitry or, in some cases, as the surface for still another SWIF.

Transducers 109—111 are spaced at different distances from input transducer 107 to develop output signals having mutually different delays. In correspondence with differences in delays of but a part of a signal cycle, the differences in the spacings are of the order of a fraction of a surface wavelength or integral multiples thereof. That is, one surface wavelength corresponds to 360°. To deliver the respective output signals, one side of each of output transducers 109—111 is connected in common to a first output terminal 112 and the other side of each of the output transducers is connected to an assigned one of output terminals 113, 114 and 115.

In use, three output or reference signals are derived at terminals 113, 114 and 115 for application to color demodulator 46 where they are mixed with the incoming chroma signal to demodulate three color control signals. The demodulation angles are, of course, determined by the relative phases of the three reference signals which, in turn, is simply a matter of the spacing of the output transducers 109, 110 and 111 from input transducer 107 as well as the spacings of these transducers relative to one another. In one mode of operation, the relative spacings of the transducers are adjusted so that the output signals have a mutual phase displacement of 120° and the delay occasioned within the SWIF which is a function of the travel time of the acoustic surface wave from the input transducer to the output transducers is chosen to obtain the three color difference signals B—Y, R—Y and G—Y at the output of demodulator 46.

Other known forms of chroma demodulating systems utilize two, rather than three, reference signals having a quadrature phase relation. In such a case only two output transducers are employed, in an arrangement similar to that of FIGS. 7 and 8, with the output transducers physically separated by one quarter of a surface wavelength. Again, it is necessary to space the output transducers from the input transducer to achieve a delay in accordance with the demodulation that is desired, that is to say, whether one chooses to demodulate and obtain the B—Y and R—Y or the I and Q color difference signals. For such a demodulator to control color image reproducer 43, it is necessary to add a further matrix in which matrixing of the luminance signal with the two outputs of the color demodulator produces the necessary third color difference signal. Such a matrix and its method of operation are well-known to the art.

Figure 12:
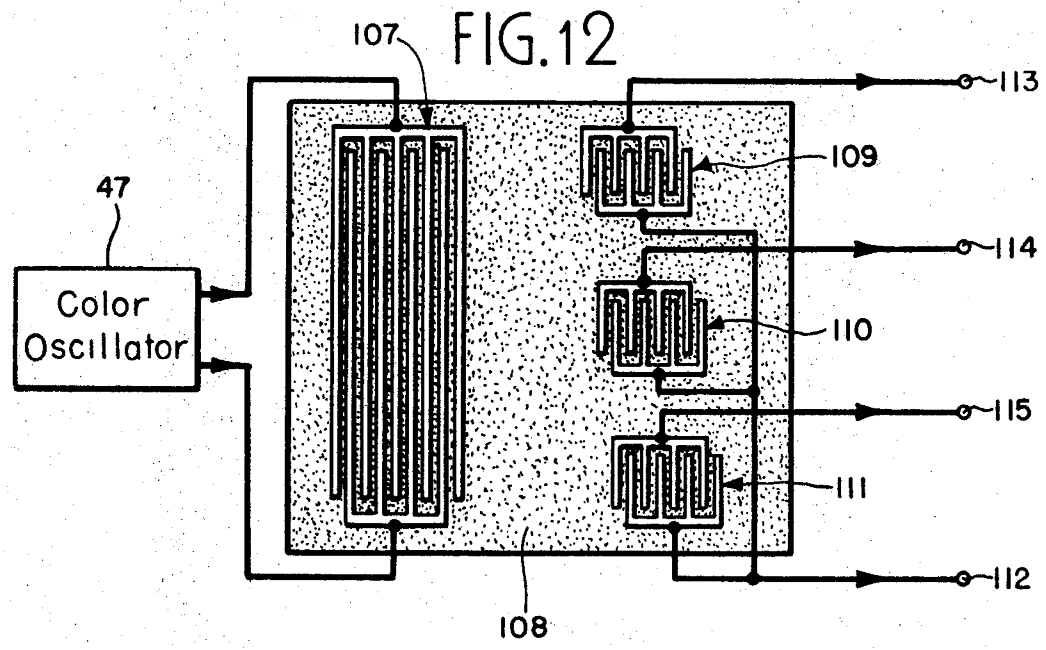
FIG. 12 is a schematic diagram of a SWIF phase splitter.
Figure 13:
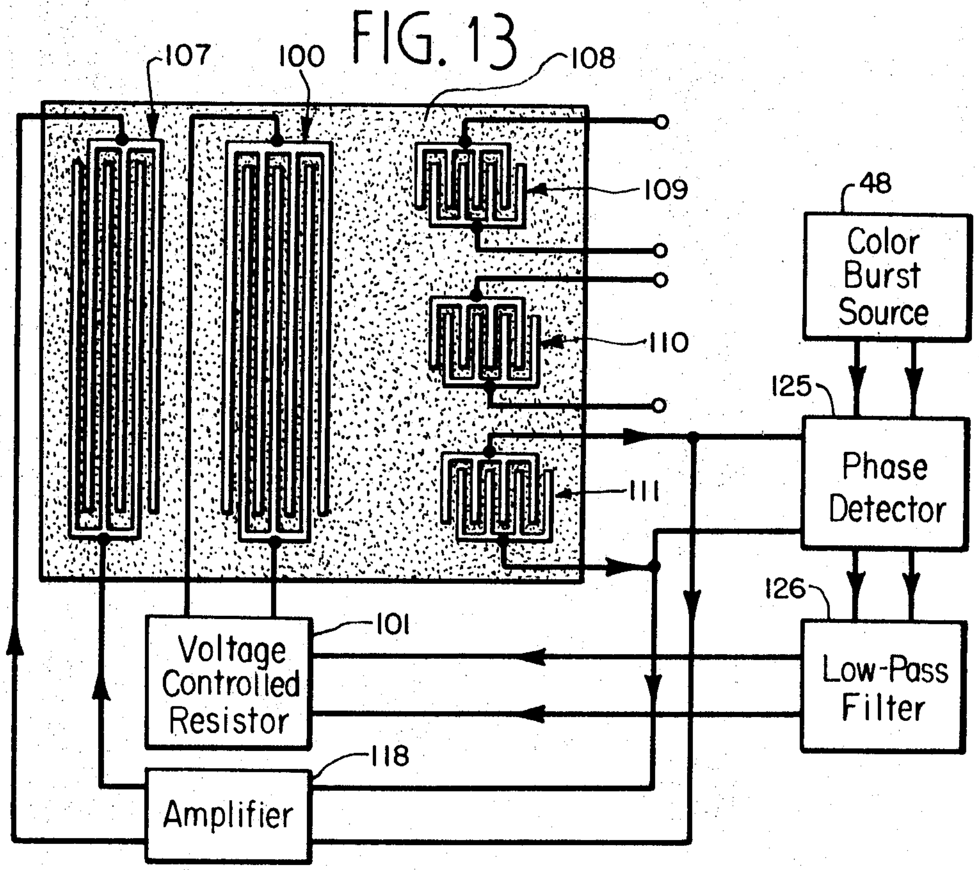
FIG. 13 is a diagram of a SWIF chroma oscillator system.

By combining the principles employed in FIGS. 9 and 12 into a single SWIF, additional integration of the circuitry of the television receiver may be achieved. As shown in FIG. 13, input transducer 107 responds to input signals from an amplifier 118 to launch acoustic surface waves through control transducer 100 toward the plurality of output transducers 109, 110 and 111. Coupled across control transducer 100 is variable load impedance 101 which operates to vary the transmission of the surface waves from input transducer 107 to the output transducers. In addition to effecting a controlled degree of attenuation of the transmitted surface waves in accordance with the control signal applied to load 101, it can be shown that control transducer 100 also alters the phase velocity of the surface waves in the region of transducer 100 as a function of the magnitude of the control signal. The same thing is true in the system of FIG. 9 as a result of which that SWIF arrangement may also find use in the very same way as an adjustable phase shifter instead of or in addition to its previously described function of controlling gain.

Additionally, in FIG. 13 a color burst signal source, such as burst amplifier 48 of FIG. 1, feeds the color burst signal to a phase detector 125 which also receives an output signal from transducer 111. The instantaneous relative phases of the burst signals from source 48 and the output signal from transducer 111 are compared in detector 125 to develop a control signal. That control signal is fed through a low-pass filter 126 to variable impedance 101, in this case a voltage controlled resistor, so as to adjust the load impedance impressed across transducer 100 in correspondence with changes in the relative phase between the signals sampled by detector 125 in order to maintain a constant phase relationship between those two signals. At the same time, control transducer 100 also maintains constant the relative phases of the output signals developed by the other output transducers 109 and 110 by virtue of the closed loop formed through output transducer 111. Finally, a portion of the output signal developed by transducer 111 also is fed to amplifier 118 to form a regenerative feedback loop back to input transducer 107.

For use in the receiver of FIG. 1, all of the transducers affixed to substrate 108 are fabricated to exhibit a maximum response at the 3.58 megahertz color subcarrier frequency. In operation, the loop formed by input transducer 107, output transducer 111 and amplifier 118 constitutes a color reference oscillator and hence serves the function of reference oscillator 47 in FIG. 1. In addition, the loop including phase detector 125, impedance 101 and control transducer 100 serves the function of automatic phase control system 50 in the arrangement of FIG. 1. In the manner of the SWIF system of FIG. 12 output transducers 109, 110 and 111 are unequally spaced from input transducer 107 to develop mutually different-phase color-reference signals for application to color demodulator 46 in order to extract the color-control signals from the incoming chroma signal. Two or three of the available output reference signals are employed as determined by the characteristics of the color demodulator which also determines the relative phases of the color reference signals required and, therefore, the relative spacings of the output transducers in substrate 108.

Particularly disconcerting to the desire of employing integrated circuitry in color television receivers is the physical size of the conventional wound-indicator delay line necessary in the luminance channel; it typically is a number of inches in length and the better part of an inch in width. Also troublesome in the same respect, though perhaps to a lesser degree in terms of physical size, is the frequency selective circuitry necessary in signal splitter 39 to separate the incoming composite signal as between the luminance and chroma channels. For the purpose of eliminating delay lines formed of wound coils and thus enabling more complete integrated-circuit fabrication with tremendous reduction in component size, the SWIF system of FIG. 14 may be adopted to accomplish the functions of both signal splitter 39 and delay line 41 of FIG. 1.

The system comprises a pair of input transducers 127 and 128 for responding to the intermediate-frequency composite signal from IF amplifier 32. They are disposed near opposite sides of a surface of a piezoelectric substrate 124 and are orientated to launch acoustic waves along parallel but separated paths. Spaced generally symmetrically on opposite sides of transducer 128 are a first pair of output transducers 129 and 130 that respond alike to the respective acoustic surface waves launched in opposing directions by input transducer 128 to develop respective output signals that are paralleled and fed to color detector 44 through an amplifier 131. Amplifier 131, which like color detector 44 and other associated stages of the television receiver may be of a solid-state variety integrated physically in the same package as substrate 124, preferably is included to overcome the attenuation inherent in the SWIF and further to increase the magnitude of the intermediate-frequency signal fed to detector 44.

Physically disposed on opposite sides of the other input transducer 127 are another pair of output transducers 132 and 133 that similarly developed a pair of output signals in response to acoustic surface waves launched by transducer 127. Those output signals are also paralleled and are fed through an amplifier 134 to picture detector 40 which is directly coupled to amplifier 42 in the luminance channel, omitting delay line 41.

In principle, only one output transducer is required to split the applied IF signal in deriving the output signals desired for the luminance and chroma channels, but the symmetrically positioned and paralleled pairs of output transducers preferably are employed to achieve increased efficiency for the SWIF by utilizing the surface waves inherently transmitted in both directions by each of the input transducers. It is to be noted that the spacing of output transducers 132 and 133 from input transducer 127 is physically greater than the corresponding spacings of output transducers 129 and 130 from their input transducer 128. Typically in the color television environment, this difference in spacing effectively is of the order of forty wavelengths. Consequently, by reason of the greater distance of travel of the surface waves launched by input transducer 127 in reaching output transducers 132 and 133, the luminance signal fed to picture detector 40 is significantly delayed with respect to the chroma signal supplied to color detector 44. For proper correlation at the image reproducer between the luminance information and the color information, the added time delay of the luminance signal in traversing SWIF 124 is adjusted to equalize the total time delays of the luminance and chroma channels. The added time delay of the luminance channel compensates for the delay attributable to the selective circuitry of color amplifier 45 and demodulator 46 in the chroma channel which typically is about 0.6 microsecond.

Figure 14:
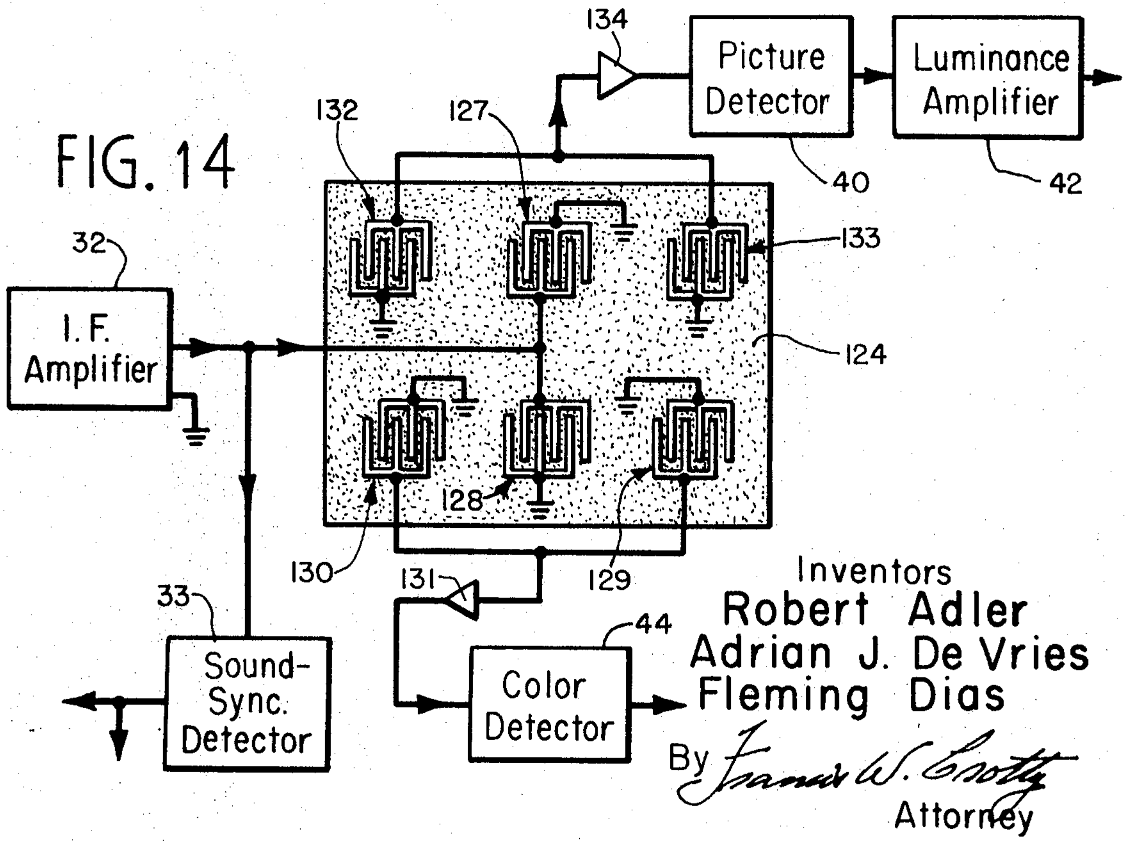
FIG. 14 and 15 are diagrams of SWIF time delay systems.

The selectivity characteristics of each of the signal channels in the SWIF arrangement of FIG. 14 are tailored in accordance with the teachings of the aforementioned copending application Serial No. 721.038, in conjunction with the characteristics of the SWIF system in IF amplifier 32 to yield the desired overall selectivity or frequency response in each of the luminance and chroma channels. Advantage preferably is taken of the sharp skirt selectivity afforded by the SWIF including input transducer 127 and output transducers 132-—133 to provide a null at the color subcarrier frequency, or at 42.17 megahertz as explained in connection with FIG. 2. This prevents the color subcarrier from reaching the image reproducer where it otherwise would create an undesirable fine dot pattern.

Figure 15:
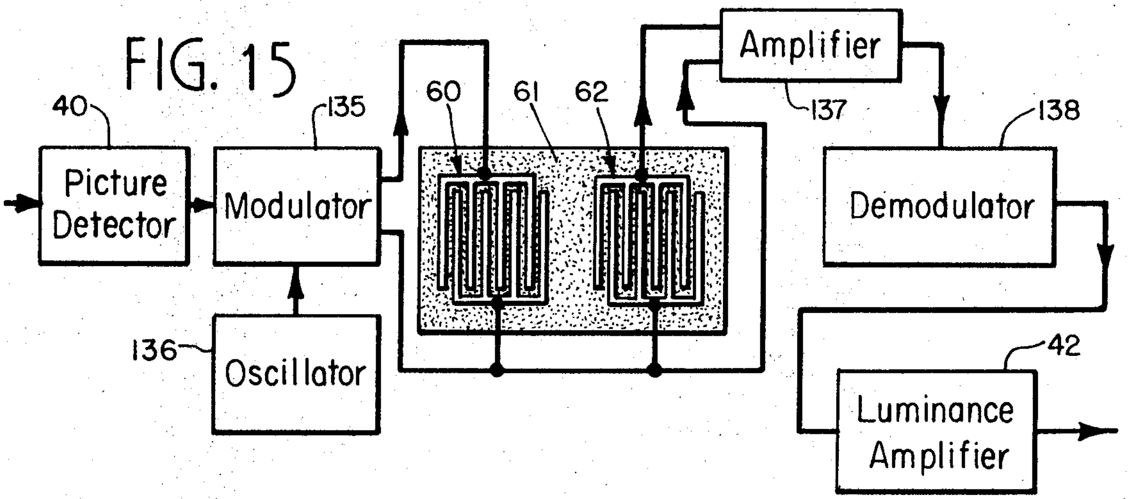

Because a SWIF is inherently a band-pass device incapable of transmitting comparatively low frequency signal components, it cannot appropriately be used directly in the system of FIG. 1 as delay element 41 following picture detector 40. When, however, it is desired to include a time delay function in the luminance channel, following picture detector 40, the SWIF system of FIG. 15, which is generally similar to that of FIG. 3 may be interposed between picture detector 40 and luminance amplifier 42. However, the picture video signal developed by detector 40 is first fed to a modulator 135 in which it is amplitude modulated upon a carrier supplied by an oscillator 136; the depth of modulation is less than 100 percent. The modulated carrier signal is then impressed across input transducer 60 which launches toward output transducer 62 surface waves that are delayed by an amount corresponding to the distance traveled from the center of transducer 60 to the center of transducer 62. The output signal developed by transducer 62, preferably after being amplified by an amplifier 137 to at least compensate the attenuation in the SWIF, is fed to a demodulator 138 which redevelops the now-delayed picture video signal and supplies it to luminance amplifier 42. Once again, the selectivity characteristics afforded by the SWIF are tailored in its fabrication to provide nulls at the frequencies of undesired signal components and thereby add selectivity in addition to time delay.

Optimum performance of the various SWIF'S discussed herein requires that the electrode pattern be deposited with precision in order to obtain the desired interelectrode spacings and frequency response. In a stage wherein phase delay of a particular amount is a design factor, the spacings between the different transducers as well as the physical characteristics of the wave-propagating surface may require care and accuracy of fabrication. In addition, certain stages of the receiver desirably may include, either by reason of their mode of operation or to permit compensation for variation in external parameters, adjustability of frequency response or phase delay; for example, in order to compensate for possible variations elsewhere in the chroma channel, it may be desirable to provide adjustability of the exact point, in terms of phase, at which the color oscillator is locked for a given automatic-phase-control potential, as in the case of the SWIF system of FIG. 13. Of course, adjustability of the hue of the reproduced polychrome image also requires the introduction of a controllable phase variation in the chroma channel. For these and other uses, the embodiments of FIGS. 16 and 17 permit a degree of flexibility or compensation.

Figure 16:
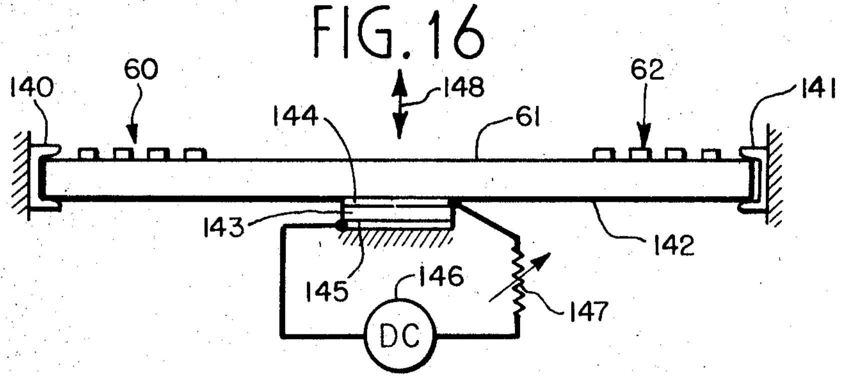
FIGS. 16 and 17 are partially schematic front elevational views of tunable or adjustable SWIFS.

In FIG. 16, substrate 61 is secured at its opposite ends in rigid supports 140 and 141. Affixed against one major surface 142, opposite its wave-propagating surface 61 and positioned between transducers 60 and 62, is an electromechanical transducer composed of a piezoelectric body 143 sandwiched between a pair of conductive electrodes 144 and 145. Electrode 145 is affixed to a rigid external structure. A direct-current signal source 146 is coupled across electrodes 144 and 145. Piezoelectric body 143 is so oriented that, upon the application of a signal from source 146, it changes its physical dimension in a direction transverse to the plane of surface 142. An adjustable resistor 147, in series with source 146 and electrodes 144—145, permits adjustment of the amplitude of the signal applied across the transducer. Alternatively, the transducers 60 and 62 may be disposed on one surface of a bimorph bender, examples of which are well known in the phonograph field.

In operation, variation of the signal level applied between electrodes 144 and 145 causes substrate 61 to be laterally flexed as indicated by arrow 148. That variation causes a change in the elastic constants of the wave-propagating surface. In turn, the surface-wave phase velocity is altered.

Although the precise nature of this phenomenon is not yet fully understood, it has been discovered that such flexing of the substrate can yield a change of surface-wave phase velocity of the order of at least one-half percent, a significant value. Hence, control of the level of the signal from source 146 permits adjustment of the delay between transducers 60 and 62.

In similar fashion, controlled variation or tuning of the selectively characteristics of a SWIF may be accomplished by controlled lateral flexing or displacement.

Figure 17:
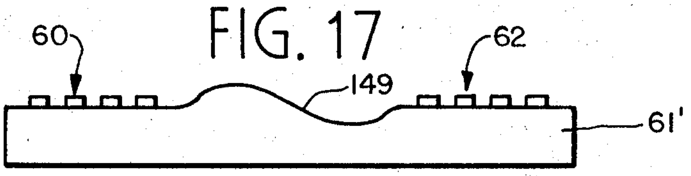

FIG. 17 illustrates another approach to the adjustment of the signal delay time between transducers 60 and 62. In this case, the substrate, now designated 61' to indicate a changed condition, is modified to include a corrugation 149 disposed in its wave propagating surface across the path of the acoustic waves. The height and depth of the corrugation, and hence the distance of wave travel across the corrugated surface, effects and determines the amount of an increase or decrease in the total length of surface-wave travel between transducer 60 and 62. That is, a deepening of the groove in the corrugation effects an increase in the delay time of signal transmission between the input and output transducers. Conversely, a removal of a portion of the hump causes a decrease in delay time. One or the other of these modifications may be used, for example, to compensate for inaccuracy in the original fabrication of the SWIF or to compensate for possible subsequent variation in the surface-wave velocity.

As indicated in the previous discussion, different SWIFS or combinations of SWIFS may be disposed on the same substrate to conserve space and materials and enable maximum integration into a single solid-state package. For example, the SWIF assembly of FIG. 14 may have its input connections separated so that first input transducer 127 is coupled to one input source and the other input transducer 128 is coupled to a different input signal source. Transducer 127 launches surface waves that propagate along a path parallel to but spaced from the path of the waves launched by transducer 128. Even though the two sets of input and output transducers are coupled to a common substrate, the surface waves traveling between the respective transducer sets are sufficiently separated to effect a high degree of isolation between the two different signal channels provided. That isolation occurs not only by reason of the effective physical spacing of the two channels but also because any wave fronts that proceed away from the desired path, for example from input transducer 127 toward output transducers 129 or 130, approach the not-intended output transducer at such an angle to its electrodes as to interact therewith only very inefficiently, if at all. The existence of a plurality of input or output transducers in correspondence with respective plurality of input or output channels permits adjustment of the selectivity characteristics individually in the different channels by tailoring the design of the individual transducers in the manner already adverted to and as discussed in detail in the aforementioned copending application.

Figure 18:
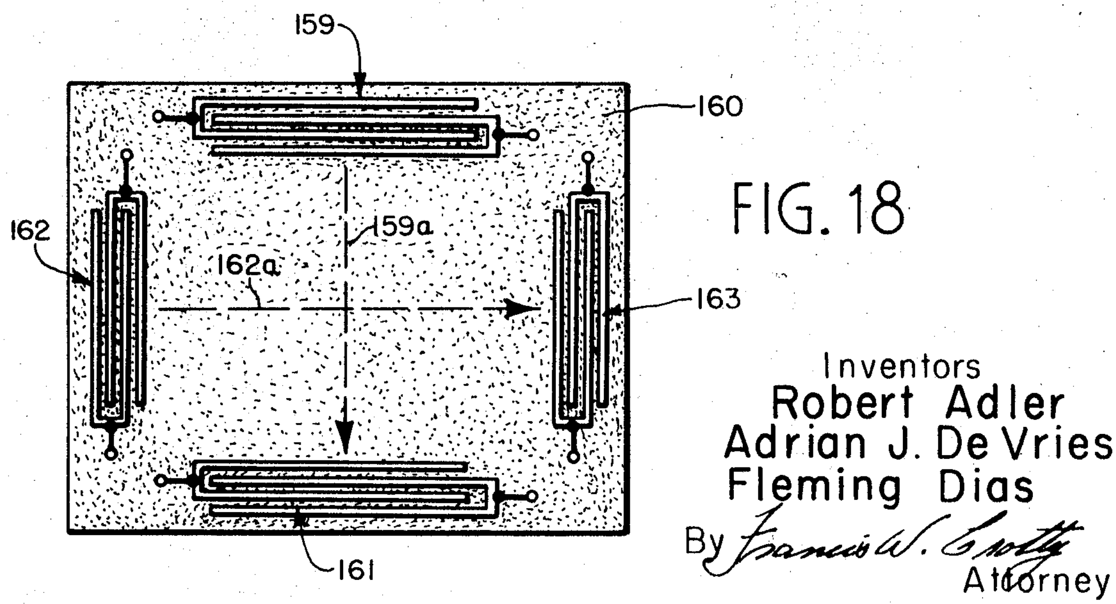
FIG. 18 is a diagram of a multiple SWIF utilizing a common substrate.

In order more efficiently to use the substrate, different surface-wave paths may cross one another. In FIG. 18, a first input transducer 159 launches surface waves over a substrate 160 along a path **159*a* to an output transducer 161. A second input transducer 162 launches surface waves along another path 162*a* to a second output transducer 163. Although the two paths 159*a* and 162*a*** cross, the signal information conveyed in each does not mix with the other. By employing a smaller angle between the crossing paths, still additional input-output transducer pairs may utilize the same wave-propagating surface.

As thus far discussed, each of the different embodiments has assumed disposition of the different transducers on an essentially planar substrate. Additionally, it has been pointed out in connection with several of the embodiments that additional efficiency may be achieved by disposing output transducers on both sides of an input transducer to utilize both of the opposingly directed surface waves launched by the input transducer. Another approach to achieving increased efficiency by utilizing both of the opposingly directed waves is to fabricate the substrate in the form of a cylinder and to dispose the input and output transducers respectively on opposite sides of the cylinder as disclosed in application Ser. No. 710,118, filed Mar. 4, 1968. With this approach to the formation of the SWIF, a single output transducer is enabled to interact with both of the waves launched by a single input transducer.

A color television receiver has been described in which many different and varied stages, that require the selectivity, delay or phase-shifting characteristics which ordinarily have been provided by the use of such discrete components as wound-coil inductors, are fabricated in the form of one or more surface wave integratable filters. The use of SWIFS for such stages permits major portions of the entire receiver to be integrated into a fully solid-state package. In this environment, the different SWIFS serve as frequency-response shapers, signal and phase delay elements, gain and phase control mechanisms, signal splitters and adders. In various combinations, they also serve as parts of oscillators, phase detectors and similar systems. Additional refinements that have been presented permit adjustability of tuning, attenuation and delay, either automatically or manually.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

We claim:

1. In a wave signal apparatus for translating a program signal, an arrangement for controlling an operating characteristic of said apparatus comprising:

an acoustic-surface-wave propagating medium;

an input transducer coupled to a first portion of said medium and responsive to an applied signal for launching and acoustic surface wave in said medium;

means for applying said program signal to said input transducer;

an output transducer coupled to a second portion of said medium and responsive to acoustic surface waves launched therein for deriving an output signal;

a control transducer coupled to a third portion of said medium located across the path of acoustic wave propagation from said input to said output transducers and effective to control a characteristic of wave transmission in said medium and said operating characteristic of said apparatus in accordance with the effective impedance represented by said control transducer;

a variable load impedance coupled across said control transducer to determine the effective impedance thereof;

and means for adjusting said load impedance to control said operating characteristic of said apparatus.

2. Apparatus as defined in claim 1 in which said load impedance includes a field-effect transistor.

3. Apparatus as defined in claim 1 in which said control transducer includes a pair of interleaved combs of electrodes and in which said load impedance includes a layer of semiconductive material disposed across electrically opposing ones of said electrodes, and at least one gating element, responsive to said adjusting means for varying the conductivity between said opposing electrodes, disposed on said layer.

4. Apparatus as defined in claim 1 in which said control transducer controls the amplitude of said waves transmitted to said output transducer.

5. Apparatus as defined in claim 1 in which said control transducer controls the phase of said waves transmitted to said output transducer.

6. In a color television receiver for utilizing a program signal having a chroma signal component angle-modulated with color information, a chroma-demodulation system comprising:

an acoustic-surface-wave propagating medium;

an input transducer coupled to said medium and extending across a wave propagation path for launching acoustic surface waves along said path in response to applied signals;

a plurality of output transducers, disposed in nonoverlapping relation across said path and individually coupled to respective portions of said medium for developing a corresponding plurality of output signals;

an amplifier coupled to one of said output transducers and constituting therewith a feedback path for applying a first one of said output signals to said input transducer with a phase, determined in part by the spacing of said one output transducer along said path from said input transducer, to sustain the generation of oscillations;

a chroma demodulator for receiving said chroma signal component;

and means coupled to at least two others of said output transducers for deriving two others of said output signals for application to said demodulator as demodulation signals of essentially equal amplitude, said two other transducers having different spacings along said path from said input transducer related to one another to establish a predetermined relative phase for said demodulation signals.

7. A chroma demodulator as defined in claim 6 for using a chroma signal having color-synchronizing components which further includes:

a control transducer coupled to said medium in the path of said waves between said input transducer and said output transducers and effective to control the phase of said acoustic waves in accordance with the effective impedance represented by said control transducer;

a variable load impedance coupled across said control transducer to determine the effective impedance thereof;

a phase detector responsive to said synchronizing signal component and to one of said output signals for developing a phase-control potential;

and means responsive to said phase-control potential for adjusting said load impedance to maintain a predetermined phase 8. A chroma demodulator in accordance with claim 6 in which the distance from said input transducer to one of said two other output transducers exceeds the distance from said input transducer to the other of said two output transducers by a distance effecting equal to one-fourth wavelength of said acoustic waves at the frequency of said demodulation signals.